(12) United States Patent
Obayashi et al.

(10) Patent No.: US 6,908,647 B2
(45) Date of Patent: Jun. 21, 2005

(54) ANTI-REFLECTION FILM AND IMAGE DISPLAY DEVICE

(75) Inventors: Tatsuhiko Obayashi, Minami-ashigara (JP); Takafumi Hosokawa, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/430,275

(22) Filed: May 7, 2003

(65) Prior Publication Data

US 2003/0232155 A1 Dec. 18, 2003

(30) Foreign Application Priority Data

May 8, 2002 (JP) ........................................ 2002-133296

(51) Int. Cl.$^7$ ........................................... G02F 1/1335
(52) U.S. Cl. ................... 428/1.32; 428/1.3; 428/421; 428/422; 428/447; 349/137; 257/437; 438/72; 526/247; 525/326.2; 525/326.3; 524/860; 524/863
(58) Field of Search ................... 428/1.3, 1.32, 428/447, 421–422; 349/137; 257/437; 438/72; 556/430, 442, 511; 524/860, 863; 526/242, 245–247, 279; 525/326.2, 326.3; 430/511

(56) References Cited

U.S. PATENT DOCUMENTS

| | | | | |
|---|---|---|---|---|
| 3,429,845 A | * | 2/1969 | Fawcett et al. | 524/442 |
| 3,429,846 A | * | 2/1969 | Bechtold et al. | 524/389 |
| 3,679,451 A | * | 7/1972 | Marks et al. | 220/2.1 R |
| 3,775,171 A | * | 11/1973 | Hermes | 428/336 |
| 4,047,804 A | * | 9/1977 | Stephens | 359/586 |
| 5,415,927 A | * | 5/1995 | Hirayama et al. | 428/307.3 |
| 5,728,508 A | * | 3/1998 | Takemura et al. | 430/315 |
| 6,288,143 B1 | * | 9/2001 | Caradori et al. | 523/213 |
| 6,794,469 B2 | * | 9/2004 | Obayashi et al. | 526/247 |

FOREIGN PATENT DOCUMENTS

| | | |
|---|---|---|
| JP | 11-189621 A | 7/1999 |
| JP | 11-228631 A | 8/1999 |
| JP | 2000-313709 A | 11/2000 |

* cited by examiner

Primary Examiner—Harold Pyon
Assistant Examiner—Sow-Fun Hon
(74) Attorney, Agent, or Firm—Burns, Doane, Swecker & Mathis, L.L.P.

(57) ABSTRACT

An anti-reflection film, having a low-refractive-index layer formed by hardening a composition, the composition containing a polysiloxane compound having a reactive organic functional group represented by formula 1, and a perfluoroolefin copolymer:

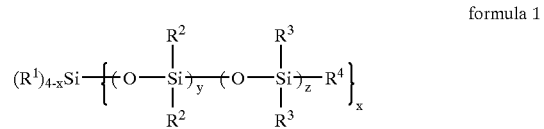

formula 1 wherein $R^1$, $R^2$, $R^3$ and $R^4$ each are a substituent having 1 to 20 carbon atoms; $R^1$s, $R^2$s, $R^3$s or $R^4$s each are the same or different; at least one of $R^1$, $R^3$ and $R^4$ is the reactive organic functional group; x is an integer of $1 \leq x \leq 4$; y is an integer of $10 \leq y \leq 500$; z is an integer of $0 \leq z \leq 500$; and the polysiloxane compound may be a random or block copolymer.

11 Claims, 1 Drawing Sheet

ANTI-REFLECTION FILM AND IMAGE DISPLAY DEVICE

FIELD OF THE INVENTION

The present invention relates to an anti-reflection film, and a display device (particularly a liquid crystal display device) provided with the same.

BACKGROUND OF THE INVENTION

In image display devices, such as a cathode-ray tube display device (CRT), a plasma display panel (PDP), and a liquid crystal display device (LCD), anti-reflection films are generally provided on the outer surface of a display, so that reflectance can be reduced, using the principle of optical interference in order to prohibit reduction in contrast owing to reflection of external (ambient) light, and also not to mirror an image of a surrounding from being seen on the display surface.

Such an anti-reflection film can be prepared by forming a low-refractive-index layer having a proper thickness, on a high-refractive-index layer. The material of the low refractive index layer is preferably as low as possible in refractive index, from the viewpoint of anti-reflection performance. In addition, high resistance to abrasion (scratch) is demanded, because it is used on the outer surface of a display. Further, evenness in thickness of the film (coating) is also important, to attain low reflectance performance. Regarding the coating-type material, both excellent coating property and leveling property are also demanded as important factors.

To realize high resistance to abrasion in a thin film of about 100 nm in thickness, it is important to enhance both the mechanical strength of the coating and the adhesive property to a subbing layer. Known means for lowering the refractive index of the aforementioned material are such as (1) incorporation of a fluorine atom, and (2) reduction of density (incorporation of voids). However, a problem arises that the mechanical strength of the coating and the adhesive property are impaired by these means, which results in lowering of resistance to abrasion.

The resistance to abrasion is remarkably improved by imparting a sliding property to the surface, while keeping the refractive index as low as possible. To impart the sliding property, such means as incorporating fluorine, and incorporating silicone, are effective. These means, which can reduce surface tension, are also expected to impart a leveling property, which is another target to improve. When a low refractive index layer contains a fluorine-containing polymer, the low refractive index layer itself has a sliding property. However, it is difficult to obtain a satisfactory sliding property by the single use of a fluorine-based material having a short side chain in which about 50 mass % of a hydrocarbon-based copolymer component is incorporated, to impart solubility to a solvent. Therefore, the fluorine-based material has hitherto been used in combination with a silicone compound.

Addition of a small amount of a silicone compound to the materials of a low refractive index layer remarkably improves both the sliding property and resistance to abrasion. Further, in addition to the sliding property, such effects as water repellency and an anti-stain (anti-fouling) property are also obtained. However, on the other hand, the addition of a silicone compound causes various problems related to compatibility with the materials of a low refractive index layer (related to transparency of the coating); bleeding out with the lapse of time or under a condition of high temperature; transfer of a silicone component to a contact medium, and both deterioration of the performance and contamination of production lines due to these problems. Particularly in the anti-reflection film, formation of haze, due to insufficiency in compatibility, is a serious problem, because it impairs optical performance. Further, when a film after coating is rolled, adhesion of silicone to a back surface of the coating constitutes an obstacle to a subsequent processing step, which results in a serious problem. In this situation, there is a need to develop a technology to effectively segregate only a silicone site on the surface of a low refractive index layer, while effectively anchoring the remaining site bonding to the silicone site in the coating of the low refractive index layer.

Regarding proposal for resolving these problems, JP-A-11-189621 ("JP-A" means an unexamined published Japanese patent application), JP-A-11-228631, and JP-A-2000-313709 disclose a fluorine-containing olefin copolymer having a polysiloxane block copolymerized component incorporated therein, using a silicone macroazo initiator, and its application to an anti-reflection film. This method remarkably improves both evenness and durability of the coating. However, to arbitrarily control the sliding property of a material, some operations during the production of fluorine-containing olefin copolymers are needed, such as increasing the amount of a silicone macroazo initiator. In the production of polysiloxane-incorporated fluorine-containing olefin copolymers, if the amount of the silicone macroazo initiator is increased to raise the content of polysiloxane component, isolation performance of the produced polymer, by means of reprecipitation, is lowered. In addition, elimination of the remaining initiator or a component formed by mutual radical-coupling of initiator species, becomes very difficult. Therefore, it is not always easy to control the incorporated amount of the polysiloxane component.

From the aforementioned situation, there is a need to develop a technology by which the incorporated amount of the silicone component can be arbitrarily controlled without impairing evenness of a coating of a low-refractive-index layer.

SUMMARY OF THE INVENTION

The present invention is an anti-reflection film, which has a low-refractive-index layer formed by hardening a composition, said composition containing a polysiloxane compound having a reactive organic functional group represented by formula 1, and a perfluoroolefin copolymer:

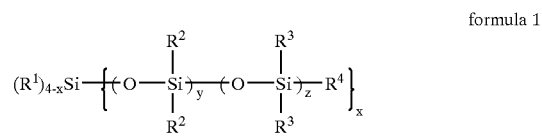

formula 1 wherein, in formula 1, $R^1$, $R^2$, $R^3$ and $R^4$ each represent a substituent having 1 to 20 carbon atoms; when there are a plurality of any of $R^1$, $R^2$, $R^3$ or $R^4$, $R^1$s, $R^2$s, $R^3$s or $R^4$s each are the same or different from each other; at least one of $R^1$, $R^3$ and $R^4$ represents the reactive organic functional group; x is an integer that is within the range of $1 \leq x \leq 4$; y is an integer that is within the range of $10 \leq y \leq 500$; z is an integer that is within the range of $0 \leq z \leq 500$; and said polysiloxane compound may be a random copolymer or a block copolymer.

Further, the present invention is an anti-reflection film, which has the above-mentioned anti-reflection film on a transparent support.

Further, the present invention is an image display device, which comprises the anti-reflection film.

Other and further features and advantages of the invention will appear more fully from the following description.

BRIEF DESCRIPTION OF THE DRAWINGS

FIG. 1(a) shows an example of 4-layer structure. FIG. 1(b) shows an example of 5-layer structure.

DETAILED DESCRIPTION OF THE INVENTION

Figure 1A:
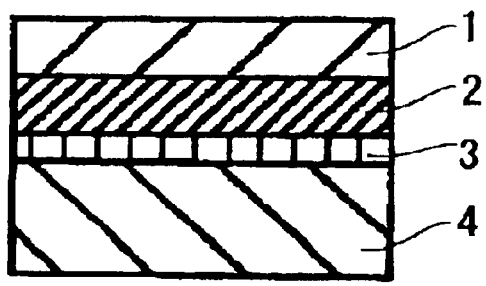
FIGS. 1(a) and 1(b) each are a cross-sectional view schematically showing a layer structure in the case that the anti-reflection film (membrane) of the present invention is a multilayer film.

According to the present invention, there is provided the following means:

1) An anti-reflection film, having a low-refractive-index layer formed by hardening a composition, said composition containing a polysiloxane compound having a reactive organic functional group represented by formula 1, and a perfluoroolefin copolymer:

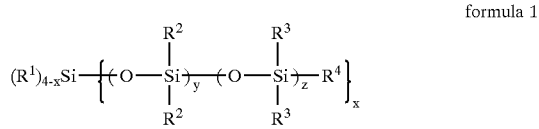

formula 1 wherein, in formula 1, $R^1$, $R^2$, $R^3$ and $R^4$ each represent a substituent having 1 to 20 carbon atoms; when there are a plurality of any of $R^1$, $R^2$, $R^3$ or $R^4$, $R^1$s, $R^2$s, $R^3$s or $R^4$s each are the same or different from each other; at least one of $R^1$, $R^3$ and $R^4$ represents the reactive organic functional group; x is an integer that is within the range of $1 \leq x \leq 4$; y is an integer that is within the range of $10 \leq y \leq 500$; z is an integer that is within the range of $0 \leq z \leq 500$; and said polysiloxane compound may be a random copolymer or a block copolymer.

2) The anti-reflection film according to the preceding item 1), wherein a coating liquid composition for the low-refractive-index layer further comprises a hardening agent.

3) The anti-reflection film according to the preceding item 1) or 2), wherein the perfluoroolefin copolymer or the hardening agent described in the above item 1) or 2) has a group having a reactive partial structure same as the reactive organic functional group incorporated in the polysiloxane compound.

4) The anti-reflection film according to any of the preceding items 1) to 3), wherein the reactive organic functional group described in the above items 1) to 3) is a ring-opening polymerizable group or a radical polymerizable group.

5) The anti-reflection film according to any of the preceding items 1) to 4), wherein the reactive organic functional group described in the above item 4) is an epoxy group, an oxetanyl group, or a (meth)acryloyl group.

6) The anti-reflection film according to any of the preceding items 1) to 5), wherein the perfluoroolefin copolymer described in the above item 1) is represented by formula 2:

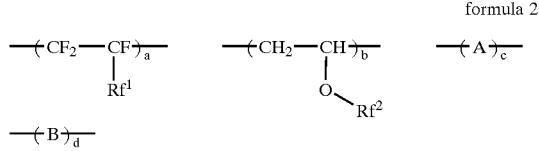

formula 2 wherein, in formula 2, $Rf^1$ represents a perfluoroalkyl group having 1 to 5 carbon atoms; $Rf^2$ represents a fluorine-containing alkyl group having 1 to 30 carbon atoms, said fluorine-containing alkyl group having a straight chain, branched chain, or alicyclic structure; A represents a component having at least one reactive group that is capable of involving in a cross-linking reaction; B represents an optional component; a, b, c and d each represent a mole fraction (%) of each component, in which a, b, c and d satisfy the following conditions:

$$5 \leq a \leq 70, \; 0 \leq b \leq 90, \; 5 \leq c \leq 95, \; 0 \leq d \leq 90.$$

7) The anti-reflection film according to the preceding item 6), wherein the component A of the perfluoroolefin copolymer described in the above item 6) at least has any of a (meth)acryloyl group, an epoxy group or an oxetanyl group.

8) The anti-reflection film according to any of the preceding items 1) to 7), wherein the coating liquid composition for the low-refractive-index layer described in the above items 1) to 7) further contains silica fine particles having an average particle size of 5 to 50 nm.

9) The anti-reflection film according to any of the preceding items 1) to 8), which has a high-refractive-index layer containing inorganic fine particles, provided between the low-refractive-index layer described in the above items 1) to 8) and a support.

10) An anti-reflection film, having the anti-reflection film according to any of the preceding items 1) to 9), on a transparent support.

11) An image display device, comprising the anti-reflection film according to the preceding item 10).

The term "perfluoroolefin copolymer" herein used refers to a copolymer composed of perfluoroolefin as at least one of copolymer components.

The anti-reflection film of the present invention has a low refractive index layer formed by hardening a composition that at least contains a polysiloxane compound having a reactive organic functional group, said polysiloxane compound being represented by formula 1 described above, and a perfluoroolefin copolymer.

The anti-reflection film may have a single-layer construction consisting of only one low refractive index layer, or alternatively a multi-layer construction in which a middle refractive index layer, a high-refractive-index layer, and a low refractive index layer are superimposed together with a hard coat layer and the like. The anti-reflection film having such multi-layer construction is preferable. Especially preferred are those having the multi-layer construction in which at least three layers of the middle refractive index layer, the high-refractive-index layer, and the low refractive index layer are superimposed. Such anti-reflection film may be directly formed (in-situ) on an image display device and the like, but it is preferable that a previously-formed anti-reflection film that may have a transparent support is provided onto an image display device.

{Example of a Preferable Layer Structure of the Anti-reflection Film}

Figure 1B:
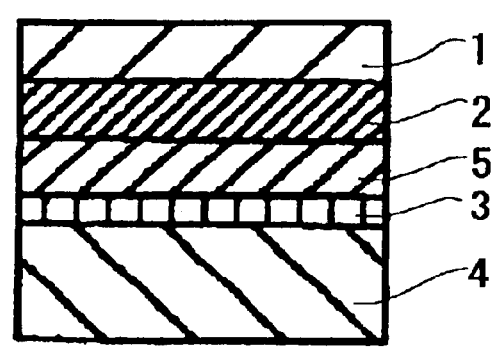

With reference to FIGS. 1(a) and 1(b), typical examples of layer structure of the anti-reflection film of the present invention will be explained.

FIGS. 1(a) and 1(b) are sectional schematic views each illustrating an example of various preferable layer structures of the anti-reflection film of the present invention. The embodiment shown in FIG. 1(a) has a layer structure wherein a transparent support (4), a hard coat layer (3), a high-refractive-index layer (2) and a low-refractive-index layer (1) are arranged in this order. In an anti-refraction film having a high-refractive-index layer (2) and a low-refractive-index layer (1), as the one shown in FIG. 1(a), it is preferable that the high-refractive-index layer satisfy the conditions shown by the following expression (I) and the low-refractive-index layer satisfy the conditions shown by the following expression (II), respectively, as described in JP-A-59-50401:

$$\frac{m}{4}\lambda \times 0.7 < n_1 d_1 < \frac{m}{4}\lambda \times 1.3 \qquad (I)$$

wherein m is a positive integral number (generally 1, 2 or 3), $n_1$ is a refractive index of the high-refractive-index layer, and $d_1$ is a thickness (nm) of the high-refractive-index layer;

$$\frac{n}{4}\lambda \times 0.7 < n_2 d_2 < \frac{n}{4}\lambda \times 1.3 \qquad (II)$$

wherein n is a positive odd number (generally 1), $n_2$ is a refractive index of the low-refractive-index layer, and $d_2$ is a thickness (nm) of the low-refractive-index layer.

The refractive index $n_1$ of the high-refractive-index layer is generally higher at least by 0.05 than that of the transparent film. The refractive index $n_2$ of the low-refractive-index layer is generally lower at least by 0.1 than that of the high-refractive-index layer and lower at least by 0.05 than that of the transparent film. Further, the refractive index n1 of the high-refractive-index layer is generally in the range of 1.57 to 2.40.

The embodiment shown in FIG. 1(b) has a layer structure wherein a transparent support (4), a hard coat layer (3), a middle-refractive-index layer (5), a high-refractive-index layer (2) and a low-refractive-index layer (1) are arranged in this order. In an anti-refraction film having a middle-refractive-index layer (5), a high-refractive-index layer (2) and a low-refractive-index layer (1), as the one shown in FIG. 1(b), it is preferable that the middle-refractive-index layer satisfy the conditions shown by the following expression (III), the high-refractive-index layer satisfy the conditions shown by the following expression (IV), and the low-refractive-index layer satisfy the conditions shown by the following expression (V), respectively, as described in JP-A-59-50401:

$$\frac{h}{4}\lambda \times 0.7 < n_3 d_3 < \frac{h}{4}\lambda \times 1.3 \qquad (III)$$

wherein h is a positive integral number (generally 1, 2 or 3), $n_3$ is a refractive index of the middle-refractive-index layer, and $d_3$ is a thickness (nm) of the middle-refractive-index layer;

$$\frac{j}{4}\lambda \times 0.7 < n_4 d_4 < \frac{j}{4}\lambda \times 1.3 \qquad (IV)$$

wherein j is a positive integral number (generally 1, 2 or 3), $n_4$ is a refractive index of the high-refractive-index layer, and $d_4$ is a thickness (nm) of the high-refractive-index layer;

$$\frac{k}{4}\lambda \times 0.7 < n_5 d_5 < \frac{k}{4}\lambda \times 1.3 \qquad (V)$$

wherein k is a positive odd number (generally 1), $n_5$ is a refractive index of the low-refractive-index layer, and $d_5$ is a thickness (nm) of the low-refractive-index layer.

The refractive index $n_3$ of the middle-refractive-index layer is generally in the range of 1.5 to 1.7. The refractive index $n_4$ of the high-refractive-index layer is generally in the range of 1.7 to 2.2.

Further, λ in formulae (I) to (V) represents a wavelength of visible radiation within the range of 380 to 680 nm. The terms "high-refractive index", "middle-refractive index", and "low-refractive index" described herein mean relative magnitude of the refractive indices among layers. For example, the middle-refractive-index layer can be prepared by a method changing the content of high-refractive-index inorganic fine particles contained in the high-refractive-index layer, or other methods.

The anti-reflection film having the above-described layer structure at least has a low-refractive-index layer improved according to the present invention.

{Low Refractive Index Layer}

The low-refractive-index layer is disposed above the high-refractive-index layer, as shown in FIGS. 1(a) and (b). The upper side of the low-refractive-index layer is a surface of the anti-reflection film.

The low-refractive-index layer has a refractive index preferably in the range of 1.20 to 1.49, more preferably in the range of 1.20 to 1.45, and especially preferably in the range of 1.20 to 1.43.

The low refractive index layer has a thickness preferably in the range of 50 to 400 nm, and more preferably in the range of 50 to 200 nm. A haze of the low-refractive-index layer is preferably 3% or less, more preferably 2% or less, and most preferably 1% or less. A practical mechanical strength of the low-refractive-index layer is preferably H or greater, more preferably 2H or greater, and most preferably 3H or greater, in terms of pencil grade according to the pencil hardness test under the load of 1 Kg.

The low-refractive-index layer according to the present invention is formed by hardening a composition, which composition contains the polysiloxane compound having a reactive organic functional group, the polysiloxane compound being represented by formula 1 described above, and the perfluoroolefin copolymer.

A mass ratio of the polysiloxane compound to the perfluoroolefin copolymer is preferably from 0.05:100 to 20:100, more preferably from 0.5:100 to 5:100.

In formula 1, $R^1$ to $R^4$ each represent a substituent having 1 to 20 carbon atoms, preferably a substituent having 1 to 10 carbon atoms. When there are a plurality of $R^1$, $R^2$, $R^3$ or $R^4$, each of $R^1$s, $R^2$s, $R^3$s, or $R^4$s may be the same or different from each other. At least one of $R^1$, $R^3$, and $R^4$ represents the reactive organic functional group.

The term "reactive organic functional group" used in the present invention refers to a group capable of forming a bond upon reacting with a cross-linkable group in the hardening agent or the perfluoroolefin copolymer, both of which are used to form the low-refractive-index layer. Examples of the reactive organic functional group include a group having an active hydrogen atom (for example, a hydroxyl group, a carboxyl group, an amino group, a carbamoyl group, a mercapto group, a β-ketoester group, a hydrosilyl group, a silanol group), a cationic polymerizable group (for example, an epoxy group, an oxetanyl group, an oxazolyl group, a vinyloxy group), a group having an unsaturated double bond capable of being involved in addition or polymerization of radical species (for example, an acryloyl group, a methacryloyl group, an allyl group), a hydrolytic silyl group (for example, an alkoxysilyl group, an acryloxysilyl group), and a group that can be substituted with an acid anhydride, an isocyanate group or a nucleophilic reagent (for example, an active halogen atom, a sulfonic acid ester).

These reactive groups are important to both compatibility of a silicone component in the low-refractive-index layer, and prevention of the silicone component from bleeding out of the low-refractive-index layer. The reactive groups are properly selected in accordance with reactivity of a hardening agent or a perfluoroolefin copolymer to be contained in the low-refractive-index layer. It is particularly preferable in the present invention that the perfluoroolefin copolymer or the hardening agent has the same functional group as the reactive organic functional group set forth in formula 1. These functional groups are especially preferably a cationic ring-opening polymerizable group (an epoxy group or an oxetanyl group is especially preferable) and a radical polymerizable group (a (meth)acryloyl group is especially preferable).

In formula 1, $R^2$ represents a substituted or unsubstituted organic moiety having 1 to 20 carbon atoms, preferably an alkyl group having 1 to 10 carbon atoms (e.g., a methyl group, an ethyl group, a hexyl group), a fluoroalkyl alkyl group preferably having 1 to 10 carbon atoms (e.g., a trifluoromethyl group, a pentafluoroethyl group), or an aryl group having 6 to 20 carbon atoms (e.g., a phenyl group, a naphthyl group), more preferablyl an alkyl group or fluorinated alkyl group having 1 to 5 carbon atoms, or a phenyl group, and especially preferably a methyl group.

x represents an integer that is embraced in the range: $1 \leq x \leq 4$. y represents an integer that is embraced in the range: $10 \leq y \leq 500$, preferably $50 \leq y \leq 400$, and particularly preferably $100 \leq y \leq 300$. z represents an integer that is embraced in the range: $0 \leq z \leq 500$. Preferably, z and y satisfy the following conditions: $0 \leq z \leq y$, especially preferably $0 \leq z \leq 0.5y$.

The polysiloxane structure in the compound represented by formula 1 may be a homopolymer consisting of only the recurring unit ($-OSi(R^2)_2-$) in which two substituents ($R^2$) are the same, or it may be a random copolymer or a block copolymer each formed by combining different recurring units in which said two substituents ($R^2$) are different from each other.

A molecular mass of the compound represented by formula 1 is preferably in the range of $10^3$ to $10^6$, more preferably in the range of $5\times10^3$ to $5\times10^5$, and especially preferably in the range of $10^4$ to $10^5$.

As the polysiloxane compound represented by formula 1, use can be made of those commercially available, such as KF-100T, X-22-169AS, KF-102, X-22-3701IE, X-22-164B, X-22-5002, X-22-173B, X-22-174D, X-22-167B and X-22-161AS (each trade name, manufactured by Shin-Etsu Chemical Co., Ltd.), AK-5, AK-30 and AK-32 (each trade name, manufactured by Toagosei Co., Ltd.), SILAPLANE FM0275 and SILAPLANE FM0721 (each trade name, manufactured by CHISSO CORPORATION). Alternatively, the polysiloxane compound of formula 1 can be synthesized, for example, by a method of incorporating a functional group in a commercially available polysiloxane compound having such a reactive group as a hydroxyl group, an amino group or a mercapto group.

Preferable specific examples of the polysiloxane compound represented by formula 1 and useful in the present invention, are shown below. However, the present invention is not limited to these compounds.

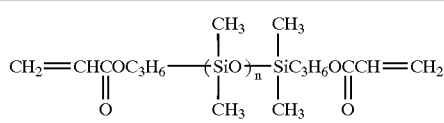

| | n |
|---|---|
| S-(1) | 50 |
| S-(2) | 100 |
| S-(3) | 200 |
| S-(4) | 500 |

S-(5)

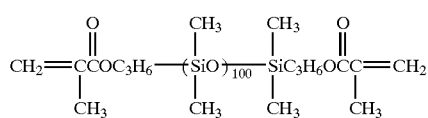

S-(6)

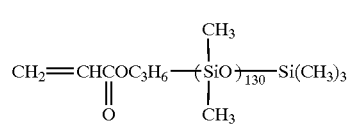

S-(7)

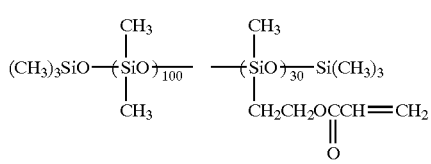

S-(8)

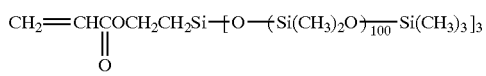

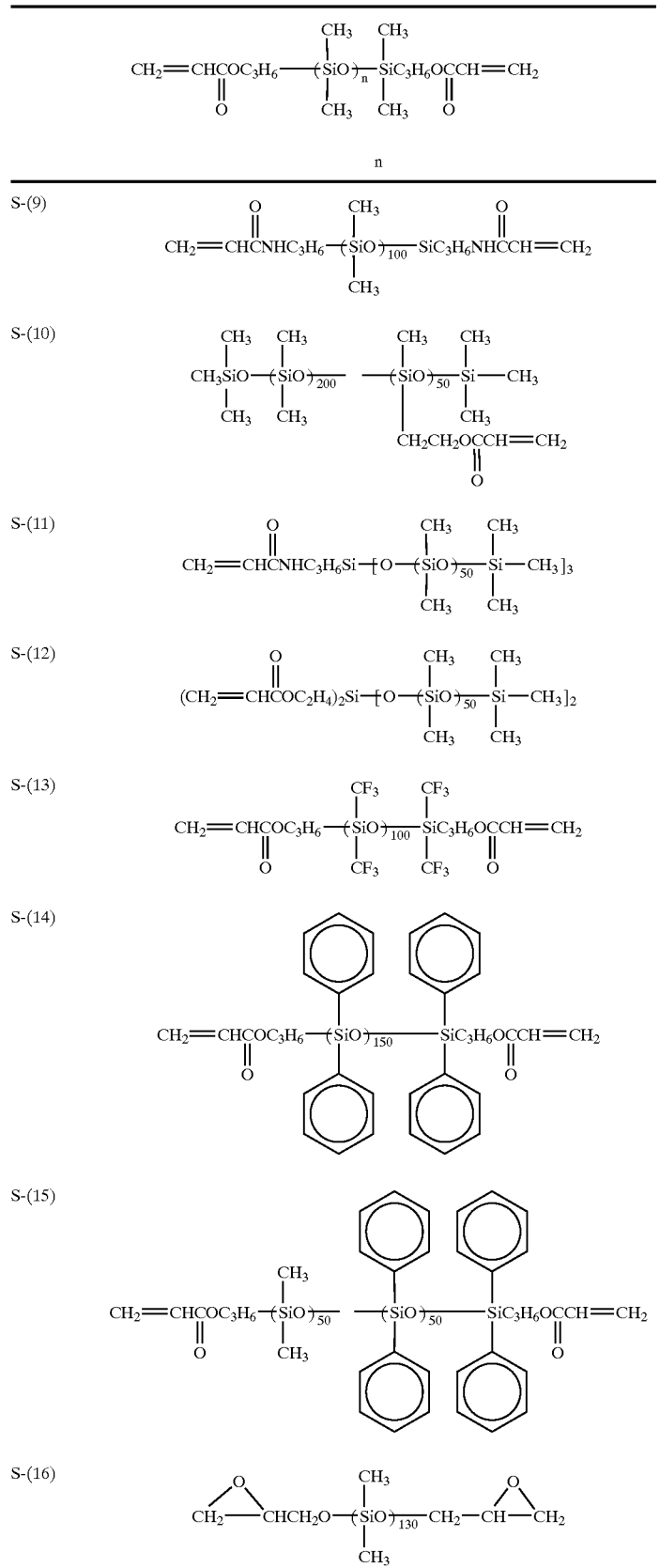

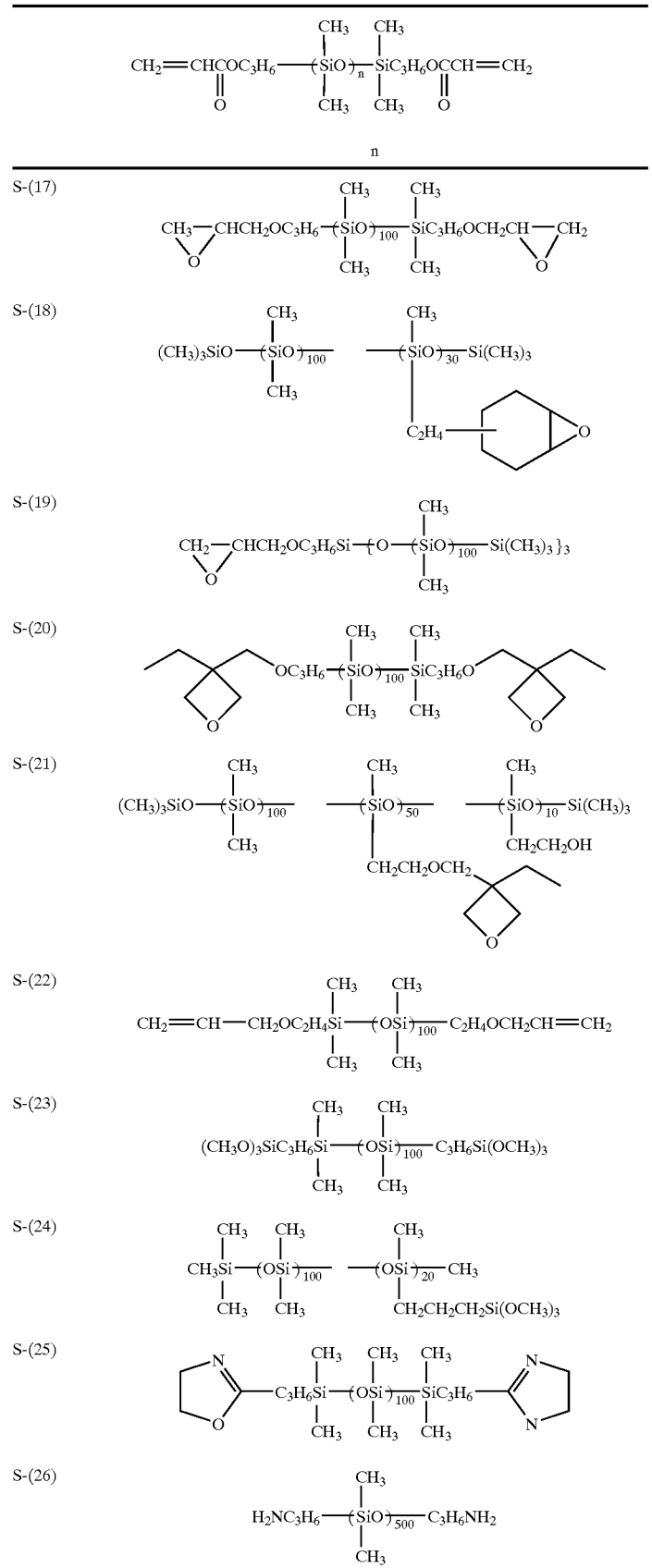

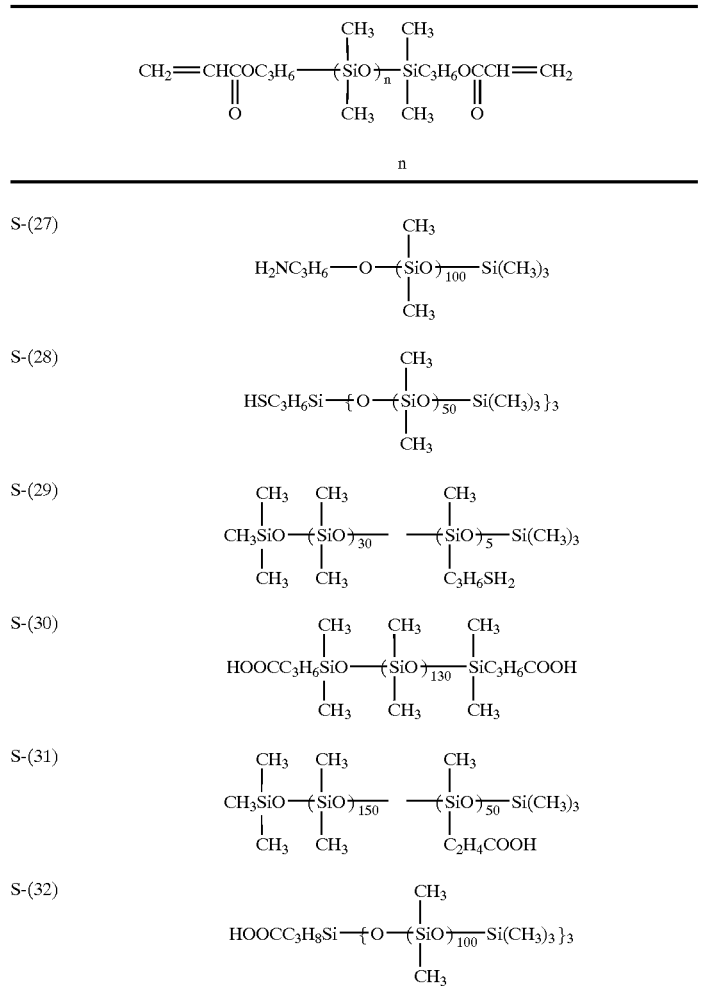

In the present invention, the compound represented by the aforementioned formula 1 is added preferably in the range of 0.01 to 20 mass %, more preferably in the range of 0.05 to 10 mass %, and especially preferably in the range of 0.5 to 5 mass %, to the total solid content to form the low-refractive-index layer. This compound is added preferably so as to become a coefficient of kinetic friction of 0.2 or less, more preferably 0.15 or less, in which the coefficient of kinetic friction is measured on the surface of the low-refractive-index layer under the conditions of 25° C. and 60% RH by means of a kinetic-friction measuring equipment (HEIDON-14, trade name), using a 5-mmø stainless steel ball with load of 0.98N and the speed of 60 cm/min.

In the low-refractive-index layer according to the present invention, a perfluoroolefin copolymer is incorporated as an essential component, together with the compound represented by the aforementioned formula 1. A general form of the perfluoroolefin copolymer useful in the present invention is a random copolymer of a perfluoroolefin and a vinyl ether or vinyl ester. This copolymer preferably has a cross-linking reactive group.

As the perfluoroolefin, those having 3 to 7 carbon atoms are preferable. Among them, perfluoropropylene and perfluorobutylene are more preferable from the viewpoint of polymerization reactivity. Particularly, perfluoropropylene is preferable from the viewpoint of availability.

A content of the perfluoroolefin component in the perfluoroolefin copolymer is generally in the range of 5 mole % to 70 mole %. For making refractive index of a material lower, it is effective to increase an incorporated rate of the perfluoroolefin component. However, in a general solvent-system radical polymerization reaction, incorporation of the perfluoroolefin is limited up to a range of about 50 mole % to about 70 mole % due to polymerization reactivity. Accordingly, incorporation over the rate of about 70 mole % is difficult. In the present invention, the content of a perfluoroolefin component is preferably in the range of 30 to 60 mole %, especially preferably in the range of 40 to 55 mole %.

The perfluoroolefin copolymer used in the present invention preferably has a cross-linking reactive group. Examples of the cross-linking reactive group are those described as examples of the reactive organic functional group in the foregoing explanation regarding the polysiloxane compound represented by formula 1. Preferable examples are also the same as the aforementioned preferable reactive organic functional groups. In the present invention, a cross-linking group having reactivity with a functional group of the polysiloxane compound of formula 1 is more preferable. Particularly preferably the perfluoroolefin copolymer and the polysiloxane compound have the same functional group.

An incorporation amount of components having these cross-linking reactive groups is generally in the range of 5 to 95 mole %, preferably in the range of 10 to 70 mole %, and especially preferably in the range of 30 to 60 mole %.
Preferable examples of the polymerization unit (A) having a cross-linking reactive group in the perfluoroolefin copolymer that can be used in the present invention are shown below. However, the present invention is not limited to these units.
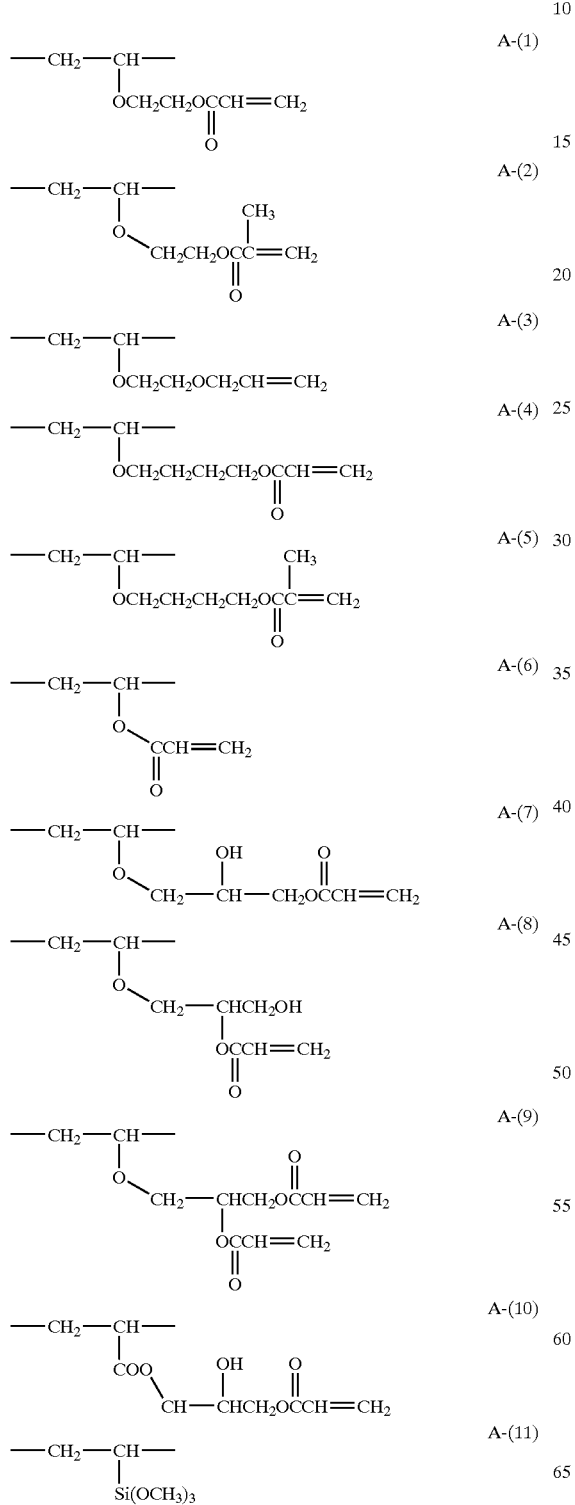
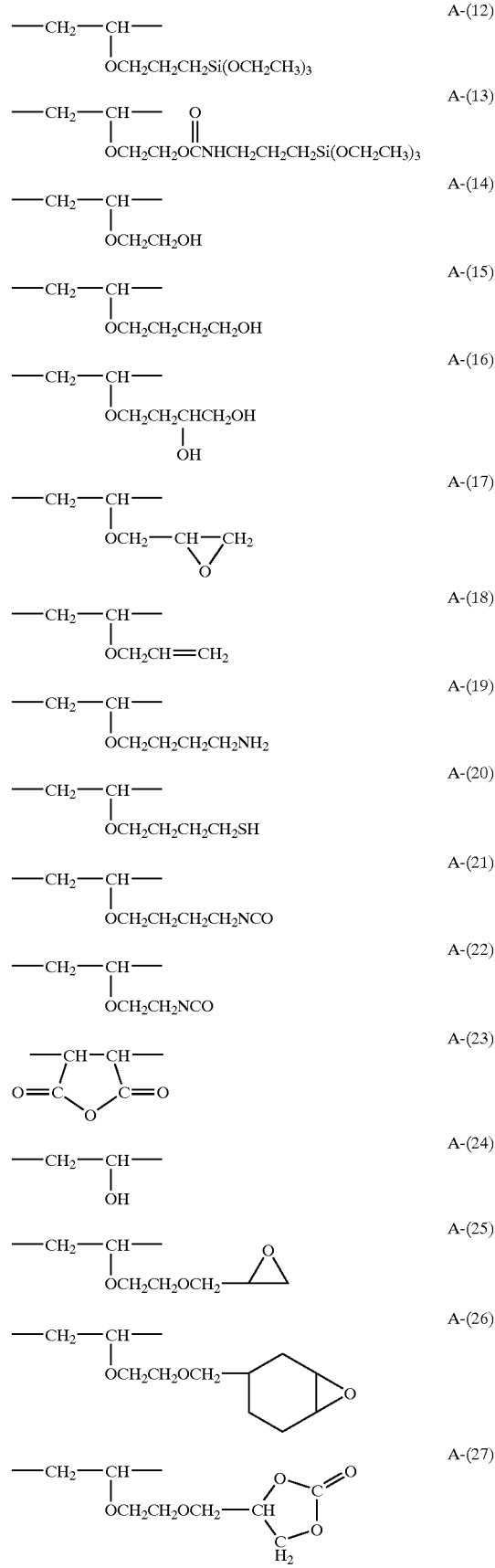

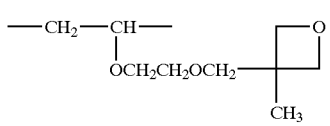
A-(28)

For making the refractive index further lower, the perfluoroolefin copolymer used in the present invention is preferably co-polymerized with a fluorine-containing vinyl ether represented by M1 described below. The copolymerizable component may be incorporated in the resulting perfluoroolefin copolymer generally in the range of 5 to 90 mole %, preferably in the range of 5 to 50 mole %, and especially preferably in the range of 10 to 30 mole %.

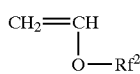
M1

In formula M1, $Rf^2$ represents a fluorine-containing alkyl group having 1 to 30 carbon atoms, preferably 1 to 20 carbon atoms, especially preferably 1 to 15 carbon atoms. The fluorine-containing alkyl group may have a straight chain (e.g., $-CF_2CF_3$, $-CH_2(CF_2)_4H$, $-CH_2(CF_2)_8CF_3$, $-CH_2CH_2(CF_2)_4H$), a branched structure (e.g., $CH(CF_3)_2$, $CH_2CF(CF_3)_2$, $CH(CH_3)CF_2CF_3$, $CH(CH_3)(CF_2)_5CF_2H$), an alicyclic structure (preferably a 5- or 6-membered ring, e.g., a perfluorocyclohexyl group, a perfluorocyclopentyl group, and alkyl groups substituted with any of these cyclic groups), or an ether moiety (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$).

The above-described monomers represented by M1 can be synthesized, for example, according to a method of subjecting a fluorine-containing alcohol to react with a split-off group-substituted alkyl vinyl ether, such as a vinyloxyalkyl sulfonate or a vinyloxyalkyl chloride, in the presence of a basic catalyst, as described in *Macromolecules*, 32(21), 7122 (1999), and JP-A-2-721; a method of exchanging a vinyl group by mixing a fluorine-containing alcohol with a vinyl ether such as butyl vinyl ether, in the presence of a catalyst such as palladium, as described in International Patent Application (PCT) No. 92/05135; and a method of performing a dehydrobromide reaction in the presence of an alkali catalyst, after a reaction of a fluorine-containing ketone with dibromoethane in the presence of a potassium fluoride catalyst, as described in U.S. Pat. No. 3,420,793.

Preferable examples of the components represented by M1 are shown below, but the present invention is not limited to these.

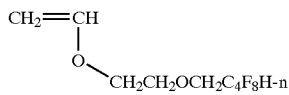
M1-(1)

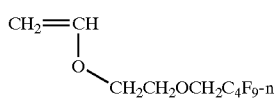
M1-(2)

M1-(3)

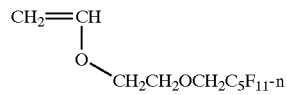
M1-(4)

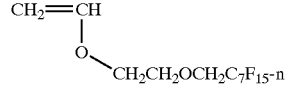
M1-(5)

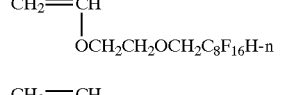
M1-(6)

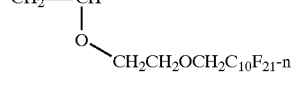
M1-(7)

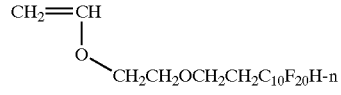
M1-(8)

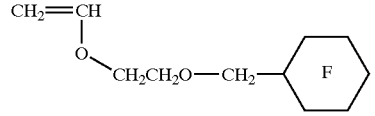
M1-(9)

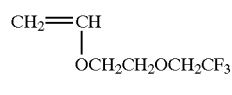
M1-(10)

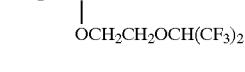
M1-(11)

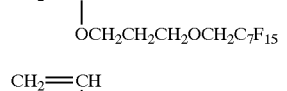
M1-(12)

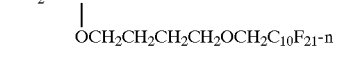
M1-(13)

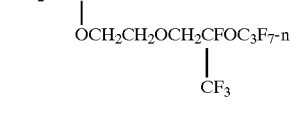
M1-(14)

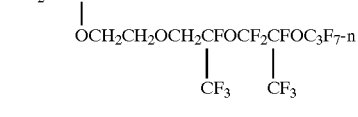
M1-(15)

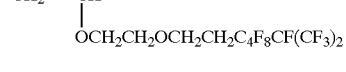
M1-(16)

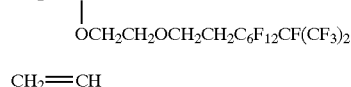
M1-(17)

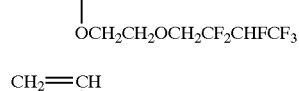
M1-(18)

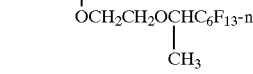
M1-(19)

M1-(20)

CH₂=CH–OCH₂CH₂OCH₂–[tetrahydrofuran ring with F substituents]

M1-(21)

CH₂=CH–OCH₂CH₂OCH₂–[tetrahydropyran ring with F substituents]

M1-(22)

$CH_2=CH-OCH_2CH_2OCF_2CF_3$

M1-(23)

$CH_2=CH-OCH_2CH_2OC_4F_9\text{-n}$

M1-(24)

$CH_2=CH-OCH_2OCH_2C_4F_9\text{-n}$

M1-(25)

$CH_2=CH-OCH_2C_4F_8H\text{-n}$

M1-(26)

$CH_2=CH-OCH_2C_6F_{12}H\text{-n}$

M1-(27)

$CH_2=CH-OCH_2C_7F_{15}$

M1-(28)

$CH_2=CH-OCH_2CH_2C_{10}F_{21}\text{-n}$

M1-(29)

$CH_2=CH-OCH_2-$[cyclohexane ring with F]

M1-(30)

$CH_2=CH-OCH_2CF(CF_3)_2$

M1-(31)

$CH_2=CH-O-CH_2CH_2CH_2C_4F_8H$

M1-(32)

$CH_2=CH-OCH_2CFOC_3F_7\text{-n}$
          |
         $CF_3$

M1-(33)

$CH_2=CH-O-CF_2CF_3$

M1-(34)

$CH_2=CH-OCF(CF_3)_2$

M1-(35)

$CH_2=CH-OCF(CF_2CF_3)_2$

M1-(36)

$CH_2=CH-OCF_2CFOCF_2CFOCH_3$
              |         |
             $CF_3$    $CF_3$

M1-(37)

$CH_2=CH-O-$[cyclohexane ring with F]

M1-(38)

$CH_2=CH-O-CH_2CH_2-$[cyclohexane ring with F]

M1-(39)

$CH_2=CH-O-CF_3$

M1-(40)

$CH_2=CH-OC_2F_4H$

M1-(41)

$CH_2=CH-OC_4F_8H$

M1-(42)

$CH_2=CH-OC_6F_{12}H$

Further, other copolymerizable components that may be optionally used are properly selected from various viewpoints such as hardness, adhesion to a substrate, solubility to a solvent, and transparency.

Examples of said other copolymerizable components include vinyl ethers, such as methyl vinyl ether, ethyl vinyl ether, t-butyl vinyl ether, n-butyl vinyl ether, cyclohexyl vinyl ether, and isopropyl vinyl ether; and vinyl esters, such as vinyl acetate, vinyl propionate, vinyl butyrate, and vinyl cyclohexanecarboxylate.

An incorporation amount of these copolymerizable components is generally in the range of 0 to 90 mole %, preferably in the range of 0 to 50 mole %, and especially preferably in the range of 0 to 30 mole %.

A particularly preferable form of the perfluoroolefin copolymer used in the present invention is represented by formula 2.

In formula 2, $Rf^1$ represents a perfluoroalkyl group having 1 to 5 carbon atoms. As to the monomer that constitutes a portion represented by $-CF_2CF(Rf^1)-$, the foregoing explanation regarding the examples of the perfluoroolefin component is applicable. $Rf^2$ represents a fluorine-containing alkyl group having 1 to 30 carbon atoms, preferably 1 to 20 carbon atoms, and especially preferably 1 to 15 carbon atoms. As to the fluorine-containing alkyl group, the foregoing explanation of the fluorine-containing alkyl group set forth with regard to the fluorine-containing vinyl ether is applicable. A and B each represent a constitutional unit having a cross-linking reactive group and an optional constitutional unit as explained above, respectively.

Specific examples of the polymer used in the present invention are shown in Tables 1 and 2 below. However, the present invention is not limited to these polymers.

In Tables 1 and 2, these polymers are described as a combination of polymerization units.

TABLE 1

| Perfluoroolefin copolymer | | P1 | P2 | P3 | P4 | P5 | P6 | P7 | P8 | P9 | P10 | P11 | P12 | P13 | P14 | P15 | P16 | P17 |
|---|---|---|---|---|---|---|---|---|---|---|---|---|---|---|---|---|---|---|
| Fundamental constitution of fluorine-containing polymer (mole fraction (%)) | Hexafluoropropylene | 50 | 50 | 50 | 50 | 50 | 50 | 55 | 45 | 50 | 50 | 50 | 50 | 50 | 50 | 50 | 50 | 50 |
| | M1-(1) | | | 10 | | | 20 | | | | 10 | 20 | | 10 | 20 | 10 | 10 | |
| | M1-(5) | | | | 5 | 10 | | | | | | | | | | | | 10 |
| | A-(1) | 50 | 40 | 40 | 45 | 40 | 30 | 45 | 55 | | | | | | | | | |
| | A-(14) | | 10 | | | | | | | | | | | | | | | |
| | A-(17) | | | | | | | | | 50 | 40 | 30 | | | | | | |
| | A-(25) | | | | | | | | | | | | 50 | 40 | 30 | | | |
| | A-(26) | | | | | | | | | | | | | | | 40 | | |
| | A-(28) | | | | | | | | | | | | | | | | 40 | 40 |

TABLE 2

| Perfluoroolefin copolymer | | P18 | P19 | P20 | P21 | P22 | P23 | P24 | P25 |
|---|---|---|---|---|---|---|---|---|---|
| Fundamental constitution of fluorine-containing polymer (mole fraction (%)) | Hexafluoropropylene | 50 | 50 | 50 | 50 | 50 | 50 | 50 | 50 |
| | A-(1) | 40 | 40 | | | | | | |
| | A-(25) | | | 40 | 40 | | | | |
| | A-(26) | | | | | 40 | 40 | | |
| | A-(28) | | | | | | | 40 | 40 |
| | Ethyl vinyl ether | 10 | | 10 | | 10 | | 10 | |
| | t-Butyl vinyl ether | | 10 | | 10 | | 10 | | 10 |

The synthesis of the perfluoroolefin copolymer that can be used in the present invention can be conducted according to various polymerization methods such as solution polymerization, precipitation polymerization, suspension polymerization, precipitation polymerization, mass polymerization, and emulsion polymerization. Further, at this time, synthesis can be performed according to known operations such as a batch process, a semi-continuous process and a continuous process.

As a method of initiating polymerization, known are a method of using a radical initiator and a method of irradiating light or radiation. These polymerization methods and methods of initiating polymerization are described in, for example, "Kobunshi Gosei Hoho" by Teiji Turuta, Revised Edition (published by Nikkankogyo shinbunsha, 1971) and "Kobunshi Gosei no Jikkenho" by Takayuki Ohtu and Masaetu Kinoshita (published by Kagakudojin, 1972) pp. 124 to 154.

Among these polymerization methods, solution polymerization in which a radical initiator is used is particularly preferable. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetoamide, benzene, toluene, acetonitrile, methylenechloride, chlorofolm, dichloroethane, methanol, ethanol, 1-propanol, 2-propanol and 1-butanol. These solvents may be used singly or in a combination of at least 2 kinds of solvents, or alternatively as a mixed solvent with water.

Polymerization temperature needs to be selected in relation to the molecular weight of the perfluoroolefin copolymer to be formed, the kind of an initiator, and the like. Polymerization can be performed in a wide range of from 0° C. or lower to 100° C. or higher, but it is preferably performed in the range of from 50° C. to 100° C.

Reaction pressure may be optionally selected, but it is generally in the range of 1 to 100 kg/cm$^2$, particularly preferably about 1 to about 30 kg/cm$^2$. Reaction time is generally in the range of about 5 to about 30 hours.

As the re-precipitation solvent for the thus-obtained perfluoroolefin copolymer, isopropanol, hexane and methanol are preferable.

Regarding the perfluoroolefin copolymer used in the present invention, a cross-linking reactive group may be previously introduced into a monomer that is used to prepare said copolymer. Alternatively, after preparation of a perfluoroolefin copolymer having a hydroxyl group or the like, the cross-linking reactive group may be introduced into the perfluoroolefin copolymer upon a high-molecular reaction in which said co-polymer is subjected to a reaction with an acid halide such as (meth)acrylic acid chloride, or an acid anhydride such as (meth)acrylic acid anhydride.

In order to harden a low-refractive-index layer-forming composition according to the present invention, a hardening catalyst or a hardening agent may be optionally blended with the composition. Known hardening catalysts or agents may be used. They are properly selected in accordance with reactivity of both the polysiloxane compound represented by formula 1 and the cross-linking reactive portion of the perfluoroolefin copolymer. The above-mentioned composition is generally in the form of a liquid.

When the perfluoroolefin copolymer has a radical polymerizable unsaturated double bond (e.g., an acryloyl group, a methacryloyl group), addition of a radical polymerization initiator is preferable.

The radical polymerization initiator may be any one of the compound that generates radicals by the action of heat, and the compound that generates radicals by the action of light.

As the compound that initiates radical polymerization by the action of heat, for example, organic or inorganic peroxides, and organic azo or diazo compounds may be used.

Specific examples of the above-mentioned compounds include organic peroxides such as benzoyl peroxide, benzoyl halogenoperoxide, lauroyl peroxide, acetyl peroxide, dibutyl peroxide, cumene hydroperoxide, and butyl hydroperoxide; inorganic peroxides such as hydrogen peroxide, ammonium persulfate, and potassium persulfate; azo compounds such as 2-azo-bis-isobutylonitrile, 2-azo-bis-propionitrile, and 2-azo-bis-cyclohexanedinitrile; and diazo compounds such as diazoaminobenzene and p-nitrobenzene diazonium.

In case of the compound that initiates radical polymerization by the action of heat, the film is hardened by the irradiation of active energy rays.

Examples of these photo-radical polymerization initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethoxyacetophenone, 1-hydroxydimethylphenylketone, 1-hydroxycyclohexyl phenylketone, 2-methyl-4-methylthio-2-morpholinopropiophenone and 2-benzyl-2-dimetylamino-1-(4-morpholinophenyl)butanone. Examples of the benzoines include benzoine benzenesulfonic acid ester, benzoine toluenesulfonic acid ester, benzoine methyl ether, benzoine ethyl ether, and benzoine isopropyl ether. Examples of the benzophenones include benzophenone, 2,4-dichloro benzophenone, 4,4-dichlorobenzophenone, and p-chlorobenzophenone. Examples of the phosphine oxides include 2,4,6-trimethylbenzoyldiphenylphosphine oxide. A sensitizing dye may be also preferably used in combination with these photo-radical polymerization initiators.

An addition amount of a compound that initiates a radical polymerization by the action of heat or light is an amount necessary to initiate polymerization of a carbon-carbon double bond. Generally, the amount is preferably in the range of 0.1 to 15 mass %, more preferably in the range of 0.5 to 10 mass % and especially preferably in the range of 2 to 5 mass %, based on the total solid content of the low-refractive-index-layer-forming composition, respectively.

In the case that the above-mentioned perfluoroolefin copolymer has a radical-polymerizable unsaturated double bond, the copolymer may not be used in combination with another hardening agent. However, as a hardening agent, a polyfunctional unsaturated monomer that is capable of reacting with such unsaturated bond may be added. Examples of the polyfunctional unsaturated monomer include (meth)acrylate monomers derived from a polyhydric alcohol, such as dipentaerythritol hexa(meth)acrylate.

In the case where these hardeners are added, the addition amount of these hardeners is preferably in the range of about 0.5 to about 300 mass parts, especially preferably in the range of about 5.0 to about 100 mass parts, based on 100 mass parts of the above-mentioned perfluoroolefin copolymer.

In the case that the cross-linking reactive portion of the perfluoroolefin copolymer has a cationic copolymerizable group (e.g., an epoxy group, an oxetanyl group, an oxazolyl group, a vinyloxy group), it is preferable to add a compound that generates an acid (acid catalyst) by the action of light as a hardening catalyst.

As examples of the compound that generates acids by the action of light, various compounds are described in, for example, "Imeizingu yo Yuki Zairyo" edited by Yuki Erekutoronikusu Zairyo Kenkyukai (Bunshin Shuppan), pp. 187 to 198, and JP-A-10-282644. The compounds such as those known from these publications may be used in the present invention. Specific examples of these compounds include various kinds of onium salts such as diazonium salts, ammonium salts, phosphonium salts, iodonium salts, sulfonium salts, selenonium salts and arsonium salts, each of which has a counter ion such as $RSO_3^-$ (R represents an alkyl group, or an aryl group), $AsF_6^-$, $SbF_6^-$, $PF_6^-$ and $BF_4^-$; organic halides such as oxadiazole derivatives and S-triazine derivatives, each of which is substituted with a trihalomethyl group; organic acid esters such as o-nitrobenzyl esters, benzoin esters and imino esters; and disulfone compounds. Among these compounds, onium salts are preferable. Particularly, sulfonium salts and iodonium salts are preferable.

A sensitizing dye may also preferably be used in combination with these compounds that generate an acid by the action of light. In the present invention, the addition amount of such compound that accelerates a hardening reaction by the action of light is preferably in the range of 0.1 to 15 mass %, more preferably in the range of 0.5 to 10 mass % and especially preferably in the range of 2 to 5 mass %, based on the total solid content of the low refractive index layer-forming composition, respectively.

In this time, it is not necessary to use such a compound in combination with another hardening agent. However, the aforementioned compound may be used in combination with a polyfunctional compound, as a hardening agent, that is able to react with these cationic polymerizable groups (for example, compounds having a plurality of the cationic polymerizable group in a molecule, polybasic acids such as pyromellitic acid, trimellitic acid, phtharic acid, maleic acid, succinic acid).

In the case where these hardeners are added, the addition amount of these hardeners is preferably in the range of about 0.5 to about 300 mass parts, especially preferably in the range of about 5.0 to about 100 mass parts, based on 100 mass parts of the above-mentioned perfluoroolefin copolymer.

For example, when the polymer contains a hydrolysable silyl group that acts as a part having a hardening reactivity, known acid or base catalyst that acts as a catalyst of sol-gel reaction may be mixed. Examples of these catalysts include inorganic Brønsted acids such as hydrochloric acid, sulfuric acid and nitric acid; organic Brønsted acids such as oxalic acid, acetic acid, formic acid, methane sulfonic acid and p-toluene sulfonic acid; Lewis acids such as dibutyl tin dilaurate, dibutyl tin diacetate, dibutyl tin dioctate, triisopropoxy aluminum, and tetrabutoxy zirconium; inorganic bases such as sodium hydroxide, potassium hydroxide and ammonia; and organic bases such as triethylamine, pyridine, and tetramethyl ethylenediamine. Particularly acid catalysts are preferable. Among them, organic Brønsted acids such as p-toluene sulfonic acid, and Lewis acids such as dibutyl tin dilaurate are preferable.

The addition amount of these hardening catalysts may be varied over a wide range in accordance with the kinds of the catalyst and the part having a hardening reactivity. Generally, the addition amount is preferably 0.1 to 15 mass %, more preferably 0.5 to 10 mass %, and especially preferably 2 to 5 mass %, to the total solid content in the low-refractive-index-layer-forming composition.

Further, a compound that generates a hardening accelerator, such as an acid and a base, by the action of light may be used from the viewpoint of storage stability of the low-refractive-index layer-forming composition. When these compounds are used, the film can be cured by the irradiation of active energy rays.

As the compound that generates an acid by the action of light, those compounds explained above as a hardening catalyst for a cationic-polymerizable group are exemplified. As the compound that generates a base by the action of light, known compounds can be used. Specifically, compounds such as nitrobenzyl carbamates and dinitrobenzyl carbamates can be exemplified.

In the present invention, it is particularly preferable to use the compound that generates an acid by the action of light.

A sensitizing dye can be preferably used in combination with the above-mentioned compound that generates an acid or base by the action of light. In common with the above-mentioned ones, an addition amount of the compound that accelerates a hardening reaction by the action of light for use in the present invention is also preferably in the range of 0.1 to 15 mass %, more preferably in the range of 0.5 to 10 mass %, and especially preferably in the range of 2 to 5 mass %, based on the total solid content in the low refractive index layer-forming composition, respectively.

In order to further accelerate hardening, a dehydrating agent may be used. Examples of the dehydrating agent include carboxylic acid orthoesters (e.g., methyl orthoformate, ethyl orthoformate, methyl orthoacetate), and acid hydrides (e.g., acetic acid anhydride).

Further, the hardener may be used in combination with another type of hardener such as an organic silicate (for example, various kinds of alkoxysilane hydrolysis partial condensation products) and the like, as described in JP-A-61-258852.

In the case where these hardeners are used, the addition amount of the hardeners is preferably in the range of 0.5 to 300 mass parts, and particularly preferably in the range of 5.0 to 100 mass parts, based on 100 mass parts of the above-mentioned perfluoroolefin copolymer.

In the case where the hardening reactive part is a group having an active hydrogen atom such as a hydroxyl group, admixture of hardeners is preferable. Examples of such hardeners include polyisocyanate-series compounds, aminoplasts, polybasic acids and anhydrides of these acids.

Examples of the polyisocyanate-series compounds includes polyisocyanate compounds such as m-xylenediisocyanate, toluene-2,4-diisocyanate, hexamethylenediisocyanate, and isophoronediisocyanate; silylisocyanate compounds such as methylsilyltriisocyanate; partial condensation products of these isocyanate compounds; polymers of these isocyanate compounds; adducts of polyalcohol or a low molecular weight polyester film with these isocyanate compounds; and block polyisocyanate compounds in which the isocyanate group is blocked with a blocking agent such as phenol.

As the aminoplasts, use can be made of melamines (melamine films), guanamines (guanamine films), ureas (urea films) and the like. Among these compounds, preferred examples include methylol melamines in which etherification is at least partially made by one or more kinds of lower alcohol such as methanol, ethanol, propanol and butanol (e.g., hexamethyl-etherificated methylol melamine, hexabutyl-etherificated methylol melamine, methyl butyl-mixture etherificated methylol melamine, methyl-etherificated methylol melamine, butyl-etherificated methylol melamine), and condensation products of these melamines.

Examples of the polybasic acids or anhydrides of these acids include aromatic polycarboxylic acids, and anhydrides of these acids, such as pyromellitic acid, pyromellitic acid anhydride, trimellitic acid, trimellitic acid anhydride, phthalic acid, and phthalic acid anhydride; and aliphatic polycarboxylic acids or anhydrides of these acids, such as maleic acid, maleic acid anhydride, succinic acid and succinic acid anhydride.

In the present invention, the admixture amount of each ingredient may be properly selected. The addition amount of the hardener is preferably in the range of about 0.5 to about 300 mass parts, especially preferably in the range of about 5.0 to about 100 mass parts, based on 100 mass parts of the above-mentioned perfluoroolefin copolymer.

Alternatively, a fluorine-containing polymer and these hardeners may be previously, partially condensed before use.

In order to accelerate a hardening reaction, a catalyst that accelerates hardening may be optionally used together with the above-mentioned hardener. Examples of these catalysts include base or acid catalysts described above as the hardening catalyst for a hydrolysable silyl group. As described above, it is also preferable to use a compound that generates such catalyst by the action of light. A preferable addition amount of the catalyst is also the same as the above-mentioned hardening catalyst for the hydrolysable silyl group.

The low-refractive-index layer-forming composition that can be used in the present invention is generally prepared by dissolving a polysiloxane compound represented by formula 1, a perfluoroolefin copolymer, a hardening agent and a polymerization initiator, in an arbitrarily solvent. At this time, the concentration of the solid content may be properly varied in accordance with various uses of the copolymer. The concentration is generally about 0.01 to about 60 mass %, preferably about 0.5 to about 50 mass %, and particularly preferably about 1 to about 20 mass %.

The kind of the above-described solvent is not particularly limited so long as the composition containing the polymer represented by formula 1 is homogeneously dissolved or dispersed in the solvent, without causing precipitation of the same. Two or more kinds of solvents may be used in combination. Preferable examples of the solvent include ketones (e.g., acetone, methyl ethyl ketone, methyl isobutyl ketone), esters (e.g., ethyl acetate, butyl acetate), ethers (e.g., tetrahydrofuran, 1,4-dioxane), alcohols (e.g., methanol, ethanol, isopropyl alcohol, butanol, ethyleneglycol), aromatic hydrocarbons (e.g., toluene, xylene), and water.

To the low-refractive-index layer-forming composition used in the present invention, colloidal silica may be further added in order to improve film strength or a coating property. The average particle diameter of the colloidal silica is generally 5 to 50 nm, preferably 5 to 30 nm, and especially preferably 8 to 20 nm. Such colloidal silica can be prepared by subjecting tetraalkoxysilane as a row material to hydrolysis and polymerization condensation in the presence of a catalyst such as aqueous ammonia, according to operations described by, for example, I. M. Thomas, in Appl. Opt., 25, 1481 (1986). In addition, as commercially available products, SNOWTEX IPA-ST and MEK-ST (each trade name) manufactured by Nissan Chemical Industries, Ltd., and AEROSIL 300, AEROSIL 130 and AEROSIL 50 (all trade names) manufactured by Nippon Aerosil Co., Ltd. are available.

Addition amount of colloidal silica is generally in the range of 5 to 95 mass %, preferably in the range of 10 to 70 mass %, and particularly preferably in the range of 20 to 60 mass %, based on the total solid content of the coated and hardened low-refractive-index layer.

In addition, various kinds of additives such as silane coupling agents, surfactants, thickeners, leveling agents and the like may be optionally added to the low-refractive-index layer-forming composition used in the present invention, if necessary.

{High- and Middle-refractive-index Layers}

In case where the anti-reflection film of the present invention has a form of a multi-layer film, the low-refractive-index layer is generally used together with at least one layer having a higher refractive index than the low-refractive-index layer (i.e., the above-mentioned high-refractive-index layer and/or middle-refractive-index layer).

Examples of the organic material that can be utilized to form the above-mentioned layer having a higher refractive index than the low-refractive-index layer include a thermoplastic film (e.g., polystyrenes, polystyrene copolymers, polycarbonates, polymers having an aromatic ring, heterocyclic ring or alicyclic group excluding polystyrenes; and polymers having a halogen atom excluding a fluorine atom); a thermal film-forming composition (e.g., film-forming compositions in which melamines, phenols or epoxies are used as a hardener); urethane-forming compositions (e.g., a combination of alicyclic or aromatic isocyanate and polyol), and radical polymerizable compositions (compositions containing a modified film or pre-polymer in which a double bond is introduced into the above-mentioned compounds (polymers and the like) so that a radical curing can be performed). Materials having a high film-forming property are preferable. In a layer having a higher refractive index than the above-mentioned layer, inorganic fine particles dispersed in an organic material may be also used. Because inorganic fine particles generally have a high refractive index, even an organic material having a relatively lower refractive index, when compared to the case where an organic material is used alone, also can be used in the above-said layer. Examples of these materials include, in addition to the above-mentioned organic materials, various kinds of transparent organic materials that are able to form a stable dispersion of inorganic fine particles, such as vinyl-series copolymers including acryl-series copolymers, polyesters, alkyd films, fibrous polymers, urethane films, various kinds of hardeners that are able to harden these materials, and compositions having a hardening functional group.

Further, silicon-series compounds substituted with an organic substituent may be included in the above-mentioned organic materials. Examples of these silicon-series compounds are those represented by the following formula, or hydrolytic products thereof:

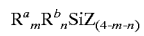

$R^a{}_m R^b{}_n SiZ_{(4-m-n)}$ in which $R^a$ and $R^b$ each represent an alkyl group, an alkenyl group, an aryl group, or a hydrocarbon group substituted with halogen, epoxy, amino, mercapto, methacryloyl or cyano; Z represents a hydrolysable group selected from the group consisting of an alkoxy group, an alkoxyalkoxy group, a halogen atom and an acyloxy group; m and n each represent 0, 1 or 2, in which m+n=1 or 2.

Preferable examples of the inorganic compound of the inorganic fine particles dispersed in the above-mentioned organic material include oxides of metallic element such as aluminum, titanium, zirconium and antimony. These compounds are commercially available, in the form of fine particles, namely powder, or a colloidal dispersion of the fine particles in water and/or other solvent. These fine particles are further mixed and dispersed in the above-mentioned organic material or organic silicon compound for use.

As the material that forms a layer having a higher refractive index than the above-mentioned materials, film-forming inorganic materials that can be dispersed in a solvent, or that are themselves liquid form (e.g., alkoxides of various elements, organic acid salts, coordination compounds bonding with a coordinating compound (e.g., chelate compounds), and inorganic polymers) are enumerated. Preferable examples of these compounds include metal alkolate compounds such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-prpoxide, zirconium tetra-n-prpoxide, zirconium tetra-n-butoxide, zirconium tetra-sec-butoxide and zirconium tetra-tert-butoxide; chelate compounds such as diisopropoxy titanium bis(acetylacetonate), dibutoxy titanium bis(acetylacetonate), diethoxy titanium bis(acetylacetonate), bis(acetylacetone zirconium), aluminum acetylacetonate, aluminum di-n-butoxide monoethylacetoacetate, aluminum di-i-propoxide monomethylacetoacetate and tri-n-butoxide zirconium monoethylacetoacetate; and inorganic polymers comprising carbon zirconyl ammonium or zirconium as a main component. In addition to the above-mentioned compounds, various kinds of alkyl silicates or hydrolytic product thereof, and silica in the form of fine particles (particularly a colloidal dispersion of silica gel) may also be used as an additional material that can be used in combination with the above-mentioned compounds, even though such an additional material is relatively low in its refractive index.

A refractive index of the high-refractive-index layer is generally in the range of 1.70 to 2.20. The refractive index can be measured by means of an Abbe refractometer or by estimate based on reflectance of light from the surface of a layer. A thickness of the high-refractive-index layer is preferably in the range of 5 nm to 10 μm, more preferably in the range of 10 nm to 1 μm, and most preferably in the range of 30 nm to 0.5 μm. A haze of the high-refractive-index layer is preferably 5% or less, more preferably 3% or less, and most preferably 1% or less. A practical mechanical strength of the high-refractive-index layer is preferably H or harder, more preferably 2H or harder, and most preferably 3H or harder, in terms of pencil grade according to the pencil hardness test under the load of 1 kg.

The refractive index of the middle-refractive-index layer is adjusted so as to become a value (magnitude) between the refractive index of the low-refractive-index layer and the refractive index of the high-refractive-index layer. The refractive index of the middle-refractive-index layer is preferably in the range of 1.50 to 1.70.

It is particularly preferable that inorganic fine particles and a polymer are used in the high-refractive-index layer, and that the middle-refractive-index layer is formed adjusting so that the refractive index of the middle-refractive-index layer becomes lower than that of the high-refractive-index layer. A haze of the middle-refractive-index layer is preferably 3% or less.

{Other Layers}

The anti-reflection film may be further provided with a hard coat layer, a moisture-proof layer, an anti-static layer, a subbing layer (under coat layer), and a protective layer. The hard coat layer is disposed to give a scratch resistance to the transparent support. The hard coat layer also has a function to strengthen adhesion between the transparent support and a layer disposed thereon. The hard coat layer may be formed using any one of acryl-series polymers, urethane-series polymers, epoxy-series polymers, silicon-series polymers, and/or silica-series compounds. A pigment may be added to the hard coat layer. The acryl-series polymers are preferably synthesized by a polymerization reaction of a multifunctional acrylate monomer (for example, a polyol acrylate, a polyester acrylate, a urethane acrylate, an epoxy acrylate). Examples of the urethane-series polymers include melamine polyurethane. As the silicon-series polymers, co-hydrolysis products of a silane compound (e.g., tetraalkoxysilane, alkyltrialkoxysilane) and a silane-coupling agent having a reactive group (e.g., epoxy, methacryl) are preferably used. Two or more kinds of polymers may be used in combination. As the silica-series compounds, colloidal silica is preferably used. The mechanical strength of the hard coat layer is preferably H or harder, more preferably 2H or harder, and most preferably 3H or harder, in terms of pencil grades under 1 Kg of load. On the transparent support, an adhesion layer, a shield layer, a slipping layer and an antistatic layer may be superimposed in addition to the hard coat layer. The shield layer is disposed to shield electromagnetic waves and/or infrared radiation.

{Transparent Support}

The anti-reflection film preferably has a transparent support, except for the case where the anti-reflection film is directly placed on a CRT image displaying surface or a lens surface. As the transparent support, a plastic film is more preferably used than a glass plate (sheet). Examples of materials to form the plastic film include cellulose esters (e.g., triacetyl cellulose, diacetyl cellulose, propionyl cellulose, butyryl cellulose, acetylpropionyl cellulose, and nitro cellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefins (e.g., polypropyrene, polyethylene, and polymethylpentene), polysulfones, polyethersulfones, polyarylates, polyether imides, poly(methyl methacrylate)s, and polyether ketones. Triacetyl cellulose, polycarbonate, polyethylene terephthalate and polyethylene naphthalate are preferred. The light transmittance of the transparent support is preferably 80% or more, and more preferably 86% or more. The haze of the transparent support is preferably 2.0% or less, and more preferably 1.0% or less. The refractive index of the transparent support is preferably in the range of 1.4 to 1.7. An infrared-ray absorbing agent or an ultra-violet-ray absorbing agent may be added to the transparent support. The amount of the infrared-ray absorbing agent to be added is preferably 0.01 to 20 mass % of the transparent support, and more preferably 0.05 to 10 mass %. Further, as a lubricant, particles of an inactive inorganic compound may be added to the transparent support. Examples of such an inorganic compound include $SiO_2$, $TiO_2$, $BaSO_4$, $CaCO_3$, talc and kaoline. The transparent support may be subjected to a surface treatment.

Examples of the surface treatment include a treatment by chemicals, a mechanical treatment, a corona discharge treatment, a flame treatment, a UV radiation treatment, a high-frequency treatment, a glow discharge treatment, an active plasma treatment, a laser treatment, a mixed-acid treatment, and an ozone-oxidation treatment. Among these examples, a glow discharge treatment, a UV radiation treatment, a corona discharge treatment and a flame treatment are preferable, and a glow discharge treatment and a UV radiation treatment are further more preferable.

{Formation of Anti-reflection Film}

In the case where the anti-reflection film is composed of a single layer, or multi layers as described above, each layer may be formed by coating, according to a dip coating process, an air-knife coating process, a curtain coating process, a roller coating process, a wire bar coating process, a gravure coating process, or an extrusion coating process (described in U.S. Pat. No. 2,681,294). Two or more than two layers may be formed by the simultaneous coating method. The references which make descriptions of the simultaneous coating method include U.S. Pat. No. 2,761,791, U.S. Pat. No. 2,941,898, U.S. Pat. No. 3,508,947, U.S. Pat. No. 3,526,528 and "Coating Engineering" by Yuji Harasaki, page 253, 1973, Asakura Shoten. It is preferable that the reflectance of the anti-reflection film is as low as possible. Specifically, the average reflectance in the wavelength region of 450 to 650 nm is preferably 2% or less, more preferably 1% or less, and most preferably 0.7% or less. In the case where the anti-reflection film does not have an anti-glare function that will be described later, the haze of the anti-reflection film is preferably 3% or less, more preferably 1% or less, and most preferably 0.5% or less. The mechanical strength of the anti-reflection film is preferably H or harder, more preferably 2H or harder, and most preferably 3H or harder, in terms of pencil grades under 1 Kg of load. The anti-reflection film may have an anti-glare function that enables to scatter external lights. The anti-glare function may be obtained by forming fine irregularities on a surface of the anti-reflection film. When fine particles are used in the low-refractive-index layer, irregularities owing to the fine particles are formed on the surface of the anti-reflection film. If the anti-glare function obtained by the fine particles is not enough, a small amount (for example, 0.1 to 50 mass %) of relatively large fine particles (for example, particle size: 50 nm to 2 $\mu$m) may be added to the low-refractive-index layer, the high-refractive-index layer, the middle-refractive-index layer, or the hard coat layer. In the case that the anti-reflection film has an anti-glare function, the haze of the anti-reflection film is preferably 3 to 30%, more preferably 5 to 20%, and most preferably 7 to 20%. The anti-reflection film can be used in an image display device such as a liquid crystal display device (LCD), a plasma display panel (PDP), an electroluminescence display (ELD), and a cathode-ray-tube display device (CRT). The anti-reflection film is disposed so that the high-refractive-index layer is placed at the side of the image displaying surface (screen) of an image display device. In the case where the anti-reflection film has the transparent support, the anti-reflection film is attached to the image display device so that the transparent support side of the film is adhered to the image displaying surface of the image display device. The anti-reflection film may also be applied to a case cover, an optical lens, a lens for glasses, a window shield, a light cover, and a helmet shield.

The anti-reflection film of the present invention is an anti-reflection film of the coating type that is suitable for mass production. Further, the anti-reflection film of the present invention is an anti-reflection film having both excellent durability and resistance to weather, in which a surface sliding property can be arbitrarily controlled and also transfer of a silicon component to a contact medium is inhibited. Further, the anti-reflection film of the present invention is an anti-reflection film that is low in reflectance and excellent in resistance to abrasion (scratch). Further, the image display device of the present invention is an image display device on which reflection is diminished.

The anti-reflection film of the present invention is high in an anti-reflection performance and excellent in scratch resistance, and moreover low in possibility of transfer of a silicone component to a contact medium. The polarizing plate and the liquid crystal display device, each of which is provided with the anti-reflection film, have such excellent properties that mirroring of external light to be seen on the display surface is fully prevented from occurring and scratch resistance is high.

Hereinafter, the present invention will be described in more detail based on the following examples, but the present invention should not be limited thereto.

EXAMPLES

<Synthetic Examples>
Synthesis of Perfluoroolefin Copolymer (P3)
1) Synthesis of M1-(1)

To a mixture of 1H,1H,5H-perfluoropentanol (100 g) and tetra-n-butyl ammonium hydrogen sulfate (20 g), an aqueous solution of sodium hydroxide (69 g) dissolved in water (100 ml) was added and stirred at room temperature for 30 minutes. Further, chloroethyl vinyl ether (183.8 g) and toluene (150 ml) were added thereto and heated with stirring at 80° C. for 5 hours.

Then, ethyl acetate was added to the resulting reaction solution, followed by washing with water. The organic layer was extracted and dried with magnesium sulfate, and condensed at reduced pressure to distill off the solvents. The resulting liquid was purified by vacuum distillation, to obtain 100 g of the above-described fluorine-containing vinyl ether (boiling point 73 to 76° C., 1064 Pa).

2) Synthesis of P3

In 100 ml (internal volume) of an autoclave made of stainless steel and provided with a stirrer, 28 ml of ethyl acetate, 6.0 g of M1-(1), 7.1 g of hydroxyethyl vinyl ether and 0.5 g of dilauroyl peroxide were placed. The interior of autoclave was degassed and substituted with a nitrogen gas. Further, 15.0 g of hexafluoro propylene (HFP) was introduced into the autoclave and heated up to 65° C. The pressure at the time when the inner temperature of the autoclave was elevated to 65° C. was 5.4 kg/cm$^2$. After stirring for 8 hours to continue the reaction while keeping the temperature at 65° C., heating was stopped at the time when the pressure was reduced to 3.2 kg/cm$^2$, and the inner temperature was allowed to lower. Then, at the time when the inner temperature lowered to room temperature, remaining unreacted monomers were removed, and then the autoclave was opened to take out a reaction solution from there. The reaction solution was poured into a large excess of hexane, and then a solvent was removed by decantation, to obtain a precipitated perfluoroolefin copolymer. The resultant perfluoroolefin copolymer was dissolved in a small amount of ethyl acetate and re-precipitated twice from hexane so that the remaining monomers were completely removed. Thereafter, 10 g of the perfluoroolefin copolymer was dissolved in 100 ml of ethyl acetate and 2.88 g of triethylamine was added. Then, 2.75 g of acrylic acid chloride was added dropwise while cooling with ice, and the resulting mixture was stirred for 5 hours. The reaction solution was washed with water. The organic layer was extracted and then concentrated. The thus-obtained perfluoroolefin copolymer was re-precipitated from hexane, to obtain 6 g of the perfluoroolefin copolymer P3 (Refractive index 1.411).

Other perfluoroolefin copolymers P1, P2, P4 to P25 used in the present invention were synthesized in the similar manner as P3.

Synthesis of Compound 1 for Comparison

Synthesis was conducted in the same manner as the aforementioned P3, except that 0.8 g of a silicone macroazo initiator (VPS-1001 (trade name) manufactured by WAKO Pure Chemical Industries, Ltd.) described in JP-A-11-189621 was added for polymerization, to obtain Compound 1 for comparison having 2 mass % of a silicone block copolymer portion incorporated therein.

Compound 1 for comparison: HFP/M1-(1)/A-1=50/10/40 (molar ratio of polymerization unit)/VPS-1001 (2 mass %)

Synthesis of Compound 2 for Comparison 12 g of Compound 2 for comparison was obtained in the same manner as Compound 1 for comparison, except that 10 g of hexafluoropropylene, 4 g of M1-(1), 7 g of A-25, 0.5 g of dilauroyl peroxide and 0.4 g of a silicone macroazo initiator VPS-1001, were mixed in 23 g of ethyl acetate, and the resulting mixture was subjected to a polymerization reaction.

Compound 2 for comparison: HFP/M1-(1)/A-25=50/10/40 (molar ratio of polymerization unit)/VPS-1001 (2 mass %)

{Example 1}

(Preparation of a Composition For a Hard Coat Layer)

In a mixed solvent of 943 g of methyl ethyl ketone and 880 g of cyclohexanon were dissolved 1296 g of trimethylolpropan triacrylate and 809 g of a 53.2 mass % solution of poly(glycydyl methacrylate) (mass average molecular mass: 1.5×10$^4$) dissolved in methyl ethyl ketone. To the resultant solution were added 48.1 g of Irgacure 184 (trade name) and 24 g of di(t-butyl phenyl iodonium hexafluoro phosphate), under stirring. The resultant mixture was stirred for 10 minutes and filtered through a filter made of polypropylene having a pore diameter of 0.5 μm, to prepare a composition for a hard coat layer.

(Preparation of Coating Liquid of Low-refractive-index Layer Material)

A mixture of components shown in Table 3 below was dissolved in methyl isobutyl ketone. The resulting solution was filtered through a polypropylene filter having a pore size of 1 μm, to prepare a coating liquid of a low-refractive-index layer.

In Table 3, the colloidal silica refers to MEK-ST (trade name) manufactured by Nissan Chemical Industries Ltd. DPHA (trade name) refers to dipentaerythritolhexaacrylate manufactured by Nippon Kayaku Co., Ltd. DEX 314 (trade name) refers to a trifunctional epoxy hardening agent manufactured by Nagase Chemicals Ltd. SH200 350 cs (trade name) refers to dimethylsiloxane oil manufactured by Toray Dow Corning Asia Ltd.

UV1 refers to a photo-radical indicator shown below. UV2 refers to a light-induced acid generator shown below. These compounds were each added in an amount of 3 mass % based on a solid content.

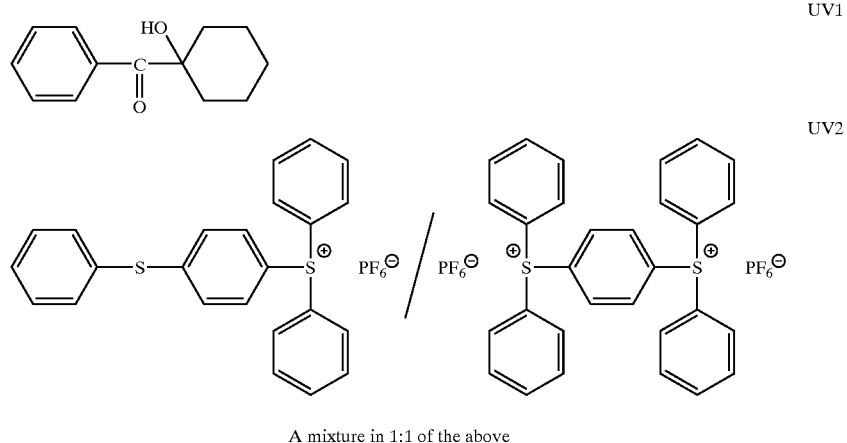

UV1

UV2

A mixture in 1:1 of the above

In table 3, numericals in parentheses { } refer to a mass part of each component.

TABLE 3

| Coating liquid | Perfluoroolefin copolymer | Hardening agent | Colloidal silica | Polysiloxane compound | Hardening catalyst |
|---|---|---|---|---|---|
| Ln1 (This invention) | P1{100} | | | S-(2){2} | UV1{3} |
| Ln2 (This invention) | P2{100} | | | S-(2){2} | UV1{3} |
| Ln3 (This invention) | P3{100} | | | S-(2){2} | UV1{3} |
| Ln4 (This invention) | P3{100} | | | S-(3){2} | UV1{3} |
| Ln5 (This invention) | P3{100} | | | S-(7){2} | UV1{3} |
| Ln6 (This invention) | P3{100} | | | S-(8){2} | UV1{3} |
| Ln7 (This invention) | P6{80} | DPHA{20} | | S-(2){2} | UV1{3} |
| Ln8 (This invention) | P9{100} | | | S-(16){2} | UV2{3} |
| Ln9 (This invention) | P13{64} | DETX{16} | MEK-ST{20} | S-(16){2} | UV2{3} |
| Ln10 (This invention) | P13{64} | DETX{16} | MEK-ST{20} | S-(16){5} | UV2{3} |
| Ln11 (This invention) | P13{64} | DETX{16} | MEK-ST{20} | S-(18){2} | UV2{3} |
| Ln12 (This invention) | P13{64} | DETX{16} | MEK-ST{20} | S-(20){2} | UV2{3} |
| Ln13 (This invention) | P13{64} | DETX{16} | MEK-ST{20} | S-(30){2} | UV2{3} |
| Ln14 (Comparative example) | P3{100} | | | | UV1{3} |
| Ln15 (Comparative example) | P13{64} | DETX{16} | MEK-ST{20} | | UV2{3} |
| Ln16 (Comparative example) | P3{100} | | | SH200 350cs {2} | UV1{3} |
| Ln17 (Comparative example) | P13{64} | DETX{16} | MEK-ST{20} | SH200 350cs {2} | UV2{3} |
| Ln18 (Comparative example) | Compound 1 for comparison{100} | | | | UV1{3} |
| Ln19 (Comparative example) | Compound 2 for comparison{100} | | | | UV2{3} |

(Preparation of a Titanium Dioxide Dispersion)

30 mass parts of titanium dioxide fine particles having a core/shell structure (TTO-55B (trade name); shell material, alumina in an amount of 9 mass % to the entire particles, manufactured by Ishihara Sangyo Kaisha, Ltd.), 4.5 mass parts of a commercially available anionic monomer (PM-21 (trade name), manufactured by Nippon Kayaku Co., Ltd.), 0.3 mass part of a commercially available cationic monomer (DMAEA (trade name), manufactured by Kohjin Co., Ltd.), and 65.2 mass parts of cyclohexanone were dispersed by means of a sand grinder mill, to prepare a dispersion of titanium dioxide having a mass-average particle size of 53 nm.

(Preparation of a Coating Solution for Middle-refractive-index Layer)

To 49.06 g of the above-mentioned titanium dioxide dispersion, 18.08 g of dipentaerythritol hexaacrylate (DPHA (trade name), manufactured by Nippon Kayaku Co., Ltd.), 0.920 g of a photopolymerization initiator (Irgacure 907 (trade name), manufactured by Ciba-Geigy), 0.307 g of a photosensitizer (Kayacure DETX (trade name), manufactured by Nippon Kayaku Co., Ltd.), 230.0 g of methyl ethyl ketone, and 500 g of cyclohexanone were added and stirred. The resulting mixture was filtered through a polypropylene filter having a mesh (pure diameter) of 0.4 μm, to prepare a coating solution of a middle-refractive-index layer.

(Preparation of a Coating Solution for High-refractive-index Layer)

To 110.0 g of the above-mentioned titanium dioxide dispersion, 6.29 g of dipentaerythritol hexaacrylate (DPHA (trade name), manufactured by Nippon Kayaku Co., Ltd.), 0.520 g of a photopolymerization initiator (Irgacure 907 (trade name), manufactured by Ciba-Geigy), 0.173 g of a photosensitizer (Kayacure DETX (trade name), manufactured by Nippon Kayaku Co., Ltd.), 230.0 g of methyl ethyl ketone and 460.0 g of cyclohexanone were added and stirred. The resulting mixture was filtered through a polypropylene filter having a mesh of 0.4 μm, to prepare a coating solution of a high-refractive-index layer.

(Preparation of an Anti-reflection Film)

The above coating composition for a hard coat layer was applied onto a triacetyl cellulose film (TAC-DU (trade name), manufactured by Fuji Photo Film Co., Ltd.) of thickness 80 μm, using a bar coater, and dried at 80° C. for 2 min. Ultraviolet rays were then irradiated to the resultant coated layer at an irradiation dose of 500 mJ/cm$^2$, to cure the coated layer, while conducting nitrogen purge to make an atmosphere of an oxygen concentration of 1.0 vol % or less, thereby forming a hard coat layer of thickness 8 μm.

The above-mentioned coating solution for a middle-refractive-index layer was coated on the hard coat layer by using a bar coater, and dried at 60° C. Thereafter, an ultraviolet ray was irradiated to the coating layer to harden the layer. Thus, a middle-refractive-index layer (refractive index: 1.70, thickness: 70 nm, TTB-55B: 21 volume %) was formed. The above-mentioned coating solution for a high-refractive-index layer was coated on the middle-refractive-index layer by using a bar coater, and dried at 60° C. Thereafter, an ultraviolet ray was irradiated to the coating layer to harden the layer. Thus, a high-refractive-index layer (refractive index: 1.95, thickness: 75 nm, TTB-55B: 51 volume %) was formed. The coating solution for a low-refractive-index layer, as shown in the above Table 3 (any one of Ln 1 to Ln 13 (the present invention) and Ln 14 to Ln 19 (comparative examples)), was coated on the high-refractive-index layer, using a bar coater, so as to become a thickness of 85 nm after hardening. After coating, an ultraviolet ray was irradiated in the atmosphere of nitrogen, and then the resultant coating layer was heated at 120° C. for 10 minutes, to form a low-refractive-index layer. Thus, an anti-reflection film was prepared.

(Evaluation of Anti-reflection Film)

Regarding the thus-obtained films having the 1st layer to 4th layer coated on the support (Ln 1 to Ln 13 (the present invention) and Ln 14 to Ln 19 (comparative examples): those having a layer structure as shown in FIG. 1(b)), the following performances were evaluated.

(1) Average Reflectance

A spectral reflectance at an incidence of 5 degrees in the wavelength region of 380 nm to 780 nm was measured, by means of a spectrophotometer (manufactured by JASCO Corporation). The thus-obtained results are presented in terms of an average mirror reflectance in the wavelength of 450 nm to 650 nm.

(2) Evaluation of Pencil Hardness

The anti-reflection film was humidified under the conditions of the temperature 25° C. and the humidity 60% RH for 2 hours. Thereafter, pencil hardness was evaluated according to the evaluation method of the pencil hardness as specified by JIS-K-5400.

(3) Scratch Resistance Test

0000 steel wool under a loading condition of 200 g/cm$^2$ was reciprocated 10 time on the surface of the film. A state of scratch occurring at that time was observed and evaluated, according to the following three grades:

○: There was no scratch.
Δ: There were observed small scratches.
X: There were observed conspicuous scratches.

(4) Evaluation of Adhesive Property

A stripping test on the squares of a checkerboard using a Cellotape (registered trademark) was carried out according to JIS-K-5400. The number (x) of measures remaining without being stripped by the tape, per 100 of divided measures was mentioned as a ratio of x/100.

(5) Measurement of Dynamic Friction Coefficient

The film sample was humidified in the conditions at 25° C. and a relative humidity of 60% RH for 2 hours, and then subjected to measurement by a HEIDON-14 dynamic friction tester using a stainless steel ball having a diameter of 5 mmø under a load of 0.98 N at a velocity of 60 cm/min. The thus-measured value was used as a dynamic friction coefficient.

(6) Test of Transfer of Sliding Component to Contacted Medium

A 80-μm thick triacetyl cellulose film (TD 80UF (trade name) manufactured by Fuji Photo Film Co., Ltd.) and any one of the above-mentioned samples were attached to each other, and they were allowed to stand under the loading condition of 2 Kg/m$^2$ at 25° C. for 24 hours. Thereafter, an amount of Si transferred onto the surface of the above TAC film base was measured using ESCA. An area ratio of Si/C was used as a parameter (index). The Si/C value of the base surface before the transfer test was 0 (zero).

The results obtained are shown in Table 4.

TABLE 4

| | Low-refractive-index layer coating liquid | Low-refractive-index layer Refractive index | Average reflectance | Pencil hardness | Scratch resistance | Adhesive property | Dynamic friction coefficient | Transfer (Si/C) |
|---|---|---|---|---|---|---|---|---|
| Example (1) | Ln1 | 1.432 | 0.33 | 3H | ○ | 100/100 | 0.08 | 0.000 |
| Example (2) | Ln2 | 1.425 | 0.29 | 3H | ○ | 100/100 | 0.09 | 0.001 |
| Example (3) | Ln3 | 1.422 | 0.28 | 3H | ○ | 100/100 | 0.07 | 0.002 |
| Example (4) | Ln4 | 1.420 | 0.27 | 3H | ○ | 100/100 | 0.08 | 0.001 |
| Example (5) | Ln5 | 1.421 | 0.27 | 3H | ○ | 100/100 | 0.09 | 0.002 |
| Example (6) | Ln6 | 1.422 | 0.28 | 3H | ○ | 100/100 | 0.10 | 0.000 |
| Example (7) | Ln7 | 1.432 | 0.33 | 3H | ○ | 100/100 | 0.10 | 0.001 |
| Example (8) | Ln8 | 1.426 | 0.30 | 3H | ○ | 100/100 | 0.09 | 0.001 |
| Example (9) | Ln9 | 1.432 | 0.32 | 2H | ○ | 100/100 | 0.09 | 0.002 |
| Example (10) | Ln10 | 1.431 | 0.31 | 3H | ○ | 100/100 | 0.05 | 0.003 |
| Example (11) | Ln11 | 1.433 | 0.32 | 2H | ○ | 100/100 | 0.07 | 0.003 |
| Example (12) | Ln12 | 1.432 | 0.32 | 2H | ○ | 100/100 | 0.09 | 0.002 |
| Example (13) | Ln13 | 1.434 | 0.33 | 2H | ○ | 100/100 | 0.10 | 0.002 |
| Comparative example (1) | Ln14 | 1.422 | 0.35 | 3H | Δ | 65/100 | 0.35 | 0.000 |
| Comparative example (2) | Ln15 | 1.432 | 0.36 | 2H | Δ | 45/100 | 0.38 | 0.000 |
| Comparative example (3) | Ln16 | 1422 | 0.34 | 3H | Δ | 100/100 | 0.12 | 0.038 |
| Comparative example (4) | Ln17 | 1.433 | 0.36 | 2H | Δ | 100/100 | 0.12 | 0.048 |
| Comparative example (5) | Ln18 | 1.424 | 0.34 | 3H | Δ | 90/100 | 0.14 | 0.005 |
| Comparative example (6) | Ln19 | 1.435 | 0.38 | 2H | Δ | 85/100 | 0.15 | 0.006 |

As is apparent from the results in these examples, it is understood that the anti-reflection film of the present invention is very low in surface reflectance covering over a wide wavelength region, and is tough and sufficiently high in film strength, and is excellent in adhesion to a substrate. Further, it is understood that a coefficient of kinetic friction of the anti-reflection film of the present invention becomes lower than that of Comparative Examples (3) to (6), even in a similar level of addition amount of a polysiloxane component, and the anti-reflection film of the present invention is excellent in scratch resistance. Further, as shown in the results of Example (10), it is understood that increase in an addition amount of a sliding agent considerably lowers a coefficient of kinetic friction, and an amount of a silicone component transferred to a contact medium also becomes low. Further, it is understood that the anti-reflection film of the present invention is excellent in leveling property of the film surface, resulting in a low reflectance.

{Preparation of a Display Device Equipped with the Anti-reflection Film}

Any one of the anti-reflection films prepared in the above Examples (1) to (13) and Comparative examples (1) to (6) was provided on a display surface of a liquid crystal display of a personal computer PC 9821NS/340W (trade name) available from Nippon Electric Co., Ltd. Thus, surface display samples were prepared. The level of mirroring a background view on the surface of these produced samples owing to a surface reflection was evaluated by examination with the naked eye. There was almost no mirroring of a background view on the display devices equipped with the anti-reflection films prepared in Examples (1) to (13) according to the present invention, so that the display image was easily observed. Further, these display devices according to the present invention had a sufficient surface mechanical strength. In contrast, even though the display devices equipped with the anti-reflection films prepared in Comparative examples (1) to (6) reduced mirroring of a background view thereon, their surface mechanical strength was poor.

Having described our invention as related to the present embodiments, it is our intention that the invention not be limited by any of the details of the description, unless otherwise specified, but rather be construed broadly within its spirit and scope as set out in the accompanying claims.

What we claim is:

1. An anti-reflection film, comprising a low-refractive-index layer formed by hardening a composition, said composition containing a polysiloxane compound having a reactive organic functional group which contributes to a crosslinking reaction, represented by formula 1, and a perfluoroolefin copolymer represented by formula 2, wherein the mass ratio of the polysiloxane compound to the perfluoroolefin copolymer is from 0.05:100 to 20:100:

formula 1

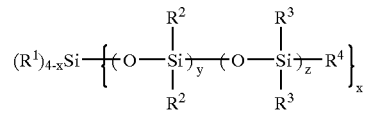

wherein, in formula 1, $R^1$, $R^2$, $R^3$ and $R^4$ each represent a substituent having 1 to 20 carbon atoms; when there are a plurality of any of $R^1$, $R^2$, $R^3$ or $R^4$, $R^1$s, $R^2$s, $R^3$s or $R^4$s each are the same or different from each other; at least one of $R^1$, $R^3$ and $R^4$ represents the reactive organic functional group; x is an integer that is within the range of $1 \leq x \leq 4$; y is an integer that is within the range of $10 \leq y \leq 500$; z is an integer that is within the range of $0 \leq z \leq 500$; and said polysiloxane compound may be a random copolymer or a block copolymer;

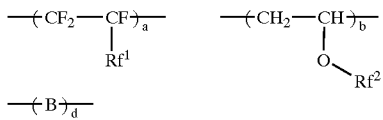

formula 2 wherein, in formula 2, $Rf^1$ represents a perfluoroalkyl group having 1 to 5 carbon atoms; $Rf^2$ represents a fluorine-containing alkyl group having 1 to 30 carbon atoms, said fluorine-containing alkyl group having a straight chain, branched chain, or alicyclic structure; A represents a component having at least one reactive organic functional group which contributes to a crosslinking reaction; B represents an optional component; a, b, c and d each represent a mole fraction (%) of each component, in which a, b, c and d satisfy the following conditions; $5 \leq a \leq 70$, $5 \leq b \leq 90$, $5 \leq c \leq 95$, $0 \leq d \leq 90$.

2. The anti-reflection film according to claim 1, wherein the perfluoroolefin copolymer described in claim 1 has a group having a reactive partial structure which is the same as the reactive organic functional group incorporated in the polysiloxane compound.

3. The anti-reflection film according to claim 1, wherein the low-refractive-index layer is applied as a liquid composition coating which further comprises a hardening agent.

4. The anti-reflection film according to claim 3, wherein the perfluoroolefin copolymer or the hardening agent described in claim 3 has a group having a reactive partial structure which is the same as the reactive organic functional group incorporated in the polysiloxane compound.

5. The anti-reflection film according to claim 1, wherein the reactive organic functional group described in claim 1 is a ring-opening polymerizable group or a radical polymerizable group.

6. The anti-reflection film according to claim 5, wherein the reactive organic functional group described in claim 5 is an epoxy group, an oxetanyl group, or a (meth)acryloyl group.

7. The anti-reflection film according to claim 1, wherein the component A of the perfluoroolefin copolymer has at least one of a (meth)acryloyl group, an epoxy group or an oxetanyl group.

8. The anti-reflection film according to claim 1, wherein the composition for the low-refractive-index layer is applied as a liquid composition coating which further contains fine silica particles having an average particle size of 5 to 50 nm.

9. The anti-reflection film according to claim 1, which has a high-refractive-index layer containing inorganic fine particles, provided between the low-refractive-index layer described in claim 1 and a support.

10. An anti-reflection film, having the anti-reflection film according to claim 1, on a transparent support.

11. An image display device, comprising the anti-reflection film according to claim 10.

* * * * *